No. 757,841.

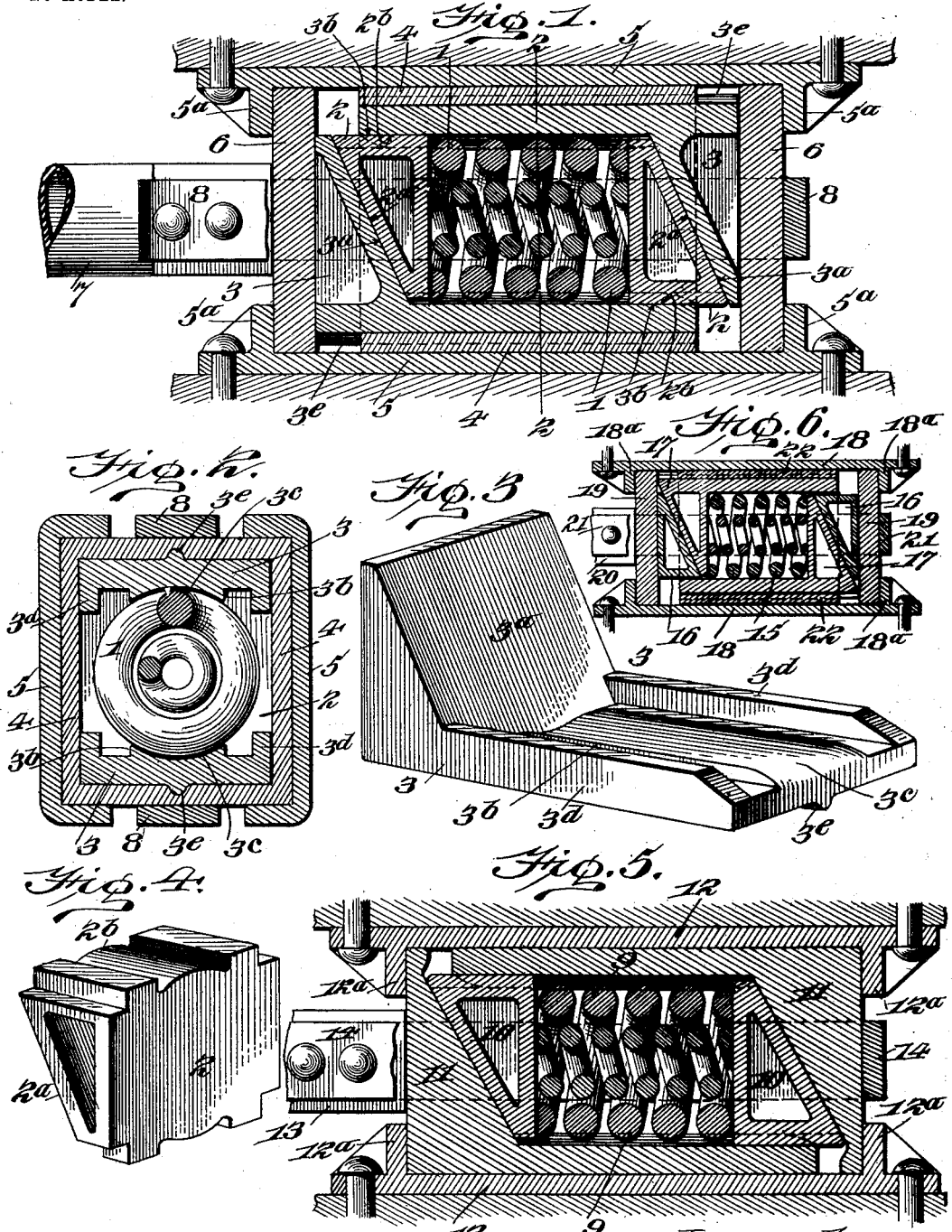

Patented April 19, 1904.

UNITED STATES PATENT OFFICE.

FREDERIC WM. RITTER, JR., OF WASHINGTON GROVE, MARYLAND.

DRAFT- AND BUFFING MECHANISM.

SPECIFICATION forming part of Letters Patent No. 757,841, dated April 19, 1904.

Application filed January 22, 1904. Serial No. 190,253. (No model.)

*To all whom it may concern:*

Be it known that I, FREDERIC WM. RITTER, Jr., a citizen of the United States, residing at Washington Grove, in the county of Montgomery and State of Maryland, have invented certain new and useful Improvements in Draft and Buffing Mechanism; and I hereby declare the following to be a full, clear, and exact description of the same, reference being had to the accompanying drawings, in which—

Figure 1 is a horizontal central section of a mechanism embodying my invention shown as adapted for use as the draft-gear of a railway-car, a portion of the coupler, portions of the draft-sills, and the usual connections and attachments being also illustrated. Fig. 2 is a transverse vertical central section taken on the line 2 2, Fig. 1, the draft-sills omitted. Fig. 3 is a perspective view of one of the friction-followers. Fig. 4 is a perspective view of one of the friction-spring abutments. Fig. 5 is a view similar to Fig. 1, showing a modification of my invention in its application to railway-draft appliances wherein the function of the casing inclosing the internal friction elements is performed by the cheek-plates and the followers are merged with the friction elements. Fig. 6 is a view similar to Fig. 1, showing a further modification of my invention.

Like symbols refer to like parts wherever they occur.

My invention relates to the construction of draft and of buffing mechanisms, or of draft and buffing mechanism, in which elastic or reactive resistances are combined with inelastic or non-reactive resistances, to the end that the ultimate resisting capacity of the device may be augmented and at the same time the reaction of the resilient resistance positively decreased and controlled.

More particularly, my invention is of that class of devices wherein springs constitute the reactive or elastic resistance, and wherein a frictional resistance is employed as the inelastic or non-reactive resistance, the reactive resistance inducing the non-reactive resistance, which is thereby rendered proportional to said reactive resistance.

To accomplish the results hereinbefore specified, I combine with a reactive-resistance element friction elements having both frictional and frictionless engagement with contacting friction elements, said contacting friction elements engaging said first-named friction elements in such manner that the friction induced is proportional to the reactive resistance and both abutment-pressures of the reactive resistance are utilized, and such a construction embodies one feature of my invention.

A second feature of my invention consists in the combination, with a reactive-resistance element, of a plurality of frictional-resistance elements between which the reactive-resistance element is interposed and a friction element which coacts with the first-named friction elements and on which one of said first-named friction elements is seated.

There are other minor features of invention, all as will hereinafter more fully appear.

I will now proceed to describe my invention more fully, so that others skilled in the art to which it appertains may apply the same.

In the principal figures of the drawings chosen to illustrate my invention, 1 is a spring or resilient element which is seated on the wedge friction elements 2 2, the inclined faces $2^a$ $2^a$ thereof engaging correspondingly-inclined faces $3^a$ $3^a$ of the friction elements 3 3 and being relatively fixed with respect thereto and the faces $2^b$ $2^b$ thereof engaging and being relatively movable with respect to the correspondingly-formed portions $3^b$ $3^b$ of said friction elements 3 3, the elements 2 2 and 3 3 being thus arranged in sets or clusters of relatively fixed elements.

All of the foregoing instrumentalities are housed or enveloped by the external casing 4, which frictionally coacts with the outer friction elements 3 3 and which may be either fixed or movable, as desired.

The cheek-plates 5 5, which are secured to the draft-sills in the usual and well-known manner, are each provided with stops $5^a$ $5^a$, which restrict or limit the outward movement of the followers 6 6 when the same are employed, said followers abutting the outer ends of the friction elements 3 3.

The portion $3^b$ of the friction element 3 is preferably provided with the curved portion $3^c$, whereby the spring is retained in alinement, and with the stiffening-ribs $3^d$ $3^d$ and $3^e$, which fit into corresponding depressions, grooves, or guideways in the contacting member, and thereby aid in maintaining the proper relation of the several parts; but, if desired, such ribs and the corresponding grooves may be omitted.

The end of the shank of the coupler 7, by which the load is applied to the mechanism, abuts the forward follower 6 and has secured thereto in the usual manner the well-known yoke 8, which passes around the casing 4 and the rear follower 6.

The construction shown in the modification Fig. 5 is substantially the same as that shown in the principal figures of the drawings in respect of the spring or reactive resistance element 9 and the friction elements 10 10 and 11 11; but the casing 4, which surrounds or envelops the friction elements in the principal figures of the drawings, is here omitted, and the cheek-plates 12 12 perform the frictional function of such external or enveloping casing. The followers 6 6 are also omitted, and the friction elements 11 11 directly engage the stops $12^a$ $12^a$ of the cheek-plates 12 12, thus performing the function of followers. The coupler 13 abuts the forward friction element 11, and the yoke 14 bears against the corresponding rear friction element.

In Fig. 6 of the drawings is shown a further modification of my invention, wherein the spring 15, casing 22, followers 19 19, cheek-plates 18 18, having the stops $18^a$ $18^a$, coupler 20, and yoke 21 are in all substantial respects like the corresponding parts heretofore described. In this modification, however, the extensions corresponding to the portion $3^b$ of the friction element 3 of the principal figures of the drawings are made a portion of the inner friction members 17 17, which bear against the spring, the outer friction elements 16 16 being made similar to the friction elements 2 2, heretofore described.

The construction being substantially such as that of the principal figures of the drawings, the operation of the device will be as follows: Draft being made upon the draw-bar or coupler 7, the yoke 8 will cause a forward travel of the rear follower 6, thus causing a corresponding longitudinal displacement of the rear set of friction elements 2 and 3, which by reason of the fact that the forward follower 6 and forward friction elements 2 and 3 are prevented from retreat by the stops $5^a$ $5^a$ of the cheek-plates 5 5 results in a relative movement lineally of said sets of elements 2 and 3 and a compression of the spring or resilient element 1. In this operation of the device friction is developed by the extended movement of the rear friction element 2 in contact with the portion $3^b$ of the forward friction element 3 and also by the movement of the portion $3^b$ of the rear friction element 3 in contact with the forward friction element 2 and with the casing or external coacting friction element 4, the means for creating pressure between the several moving friction elements being the engaged coacting inclines $2^a$ and $3^a$ of the friction elements 2 and 3, respectively, which change the direction of thrust of the interposed spring 1, both abutment reactions of the spring being thus utilized to induce pressure between frictionally-engaging elements.

In a buffing operation of the device which is similar to its operation in draft the coupler 7 forces the forward follower 6 and the forward friction elements 2 and 3 rearwardly, and the rear follower 6 and rear friction elements 2 and 3 being constrained to remain stationary by reason of the rear stops $5^a$ $5^a$ of the cheek-plates the spring is compressed and friction is developed between the forward friction element 2 and the portion $3^b$ of the rear friction element 3 and also between the portion $3^b$ of the forward friction element 3 and the external casing 4 and rear friction element 2, with which it frictionally engages.

It is to be noted that both the abutment reactions or thrusts of the spring upon both its abutments are simultaneously utilized to create pressure normal to the several elements in frictional engagement and between which friction is generated, thereby largely increasing the friction, such friction being a function of the normal pressure, and that this result is attained in such manner that a spring compressible in a line parallel to that of the movement of the coupler and in increments equal to the displacement thereof may be employed, and that the friction elements may also have a similar movement.

When a draft strain is applied to the coupler 13 of the modification shown in Fig. 5, the rear end of the yoke 14 causes a forward lineal translation of the rear friction element 11 and the rear friction element 10, seated thereon, and as the forward friction element 11 and its adjacent friction element 10 are prevented from retreating by reason of the engagement of the said forward friction element 11 with the forward stops $12^a$ $12^a$ of the cheek-plates 12 12 the spring 9 is compressed and friction is induced between the rear friction element 10 and the contacting portion of the forward friction element 11 and also between the rear friction element 11 and the forward friction element 10 and housing or casing 12, the pressure between the several relatively moving contacting friction elements being due to the inclined contacting faces of the elements 10 10 and 11 11, as previously explained.

The buffing operation of the device shown in the modification is similar to its action in draft, the forward friction elements 10 and 11 acting in the manner already described in reference to the rear friction elements 10 and 11, and vice versa.

The mechanism of such a device as illustrated in the modification Fig. 6 operates in a manner similar to that of the structures already described, as will readily be apparent.

If desired, the frictional mechanism herein shown and described may be combined with a simple preliminary spring resistance in a well-known manner, in which event the friction elements and the interposed spring would not be movable and compressible, respectively, with a displacement equal to the draw-bar, but with a displacement equal to that of the member or part of the member by which the load or force is directly applied to the cluster or set of relatively fixed friction elements, (that end of the preliminary spring which is nearer the friction mechanism,) and such a construction is intended to be within the scope of the claims, as the addition of the well-known preliminary resistance-spring in no wise changes or modifies the operation and function of the combinations hereinafter claimed.

Having thus described my invention, what I claim, and desire to secure by Letters Patent, is—

1. In a draft and buffing mechanism, the combination with a friction element having an inclined face, of a relatively fixed friction element engaging therewith, a friction element engaging said first-named friction element and relatively movable with respect thereto, said friction element having an inclined face, a friction element relatively fixed with respect to said last-named friction element and relatively movable with respect to said first-named relatively fixed friction element, and means whereby the relative movement of the friction elements induces friction between said friction elements, substantially as and for the purposes specified.

2. In a draft and buffing mechanism, the combination with a friction element having an inclined face, a relatively fixed friction element having an inclined face, a friction element engaging said first-named element and being relatively movable with respect thereto, said friction element also having an inclined face, and means whereby friction is induced between the relatively movable friction elements, substantially as and for the purposes specified.

3. In a draft and buffing mechanism, the combination with a plurality of relatively movable friction elements having inclined faces, of a friction element engaged thereby, said friction element being relatively fixed with respect to one and relatively movable with respect to another of said first-named friction elements, and means whereby friction is induced between the relatively movable friction elements, substantially as and for the purposes specified.

4. In a draft and buffing mechanism, the combination with a coacting friction element, of relatively movable sets of friction elements, each set comprised of relatively fixed elements one of which frictionally engages an element of another set of friction elements, and means for inducing friction between the frictionally-engaged elements, substantially as and for the purposes specified.

5. In a draft and buffing mechanism, the combination with an interposed spring, of relatively movable friction elements which engage each other, said friction elements having inclined faces and each being restrained in its movement in one direction, of means whereby friction is induced between the relatively movable friction elements, substantially as and for the purposes specified.

6. In a draft and buffing mechanism, the combination with an interposed resilient element, of relatively movable friction elements which engage each other, said friction elements having inclined faces and being movable with a displacement equal to the displacement of the load-applying member, a load-applying member, and an external friction element coacting with said first-named friction elements, substantially as and for the purposes specified.

7. In a draft and buffing mechanism, the combination with a resilient element, of friction elements which engage each other and which are relatively movable with a displacement equal to the displacement of the load-applying member, a load-applying member, and means whereby both abutment reactions of the spring simultaneously induce pressure between the relatively movable friction elements, substantially as and for the purposes specified.

8. In a draft and buffing mechanism, the combination with a spring, of relatively movable sets of friction elements, each set comprised of relatively fixed elements one of which frictionally engages an element of another set of friction elements, and means whereby both abutment reactions of the spring simultaneously induce pressure between the frictionally-engaged elements, substantially as and for the purposes specified.

9. In a draft and buffing mechanism, the combination with a spring, of a coacting friction element, a plurality of friction elements relatively fixed with respect to each other, and means whereby both abutment reactions of the spring simultaneously induce pressure between one of said relatively fixed friction elements and said coacting friction element, substantially as and for the purposes specified.

10. In a draft and buffing mechanism, the combination with a spring, of friction elements seated on each end thereof, said friction elements having inclined faces, a friction element engaging therewith and being relatively fixed with respect to one and relatively movable with respect to another of said friction elements, said last-named friction element also having an inclined face, and means for limiting the travel of said friction elements, substantially as and for the purposes specified.

11. In a draft and buffing mechanism, the combination with an interposed spring, of friction elements acted on thereby, said friction elements having inclined faces, friction elements having inclined faces which engage the inclined faces of said first-named friction elements and also friction-faces relatively movable with respect to said first-named friction elements, and an external friction element engaging said last-named friction elements, substantially as and for the purposes specified.

12. In a draft and buffing mechanism, the combination with an interposed spring, of friction elements acted on thereby, said friction elements having inclined faces, friction elements each of which engages said first-named friction elements and which have inclined faces, means for limiting the travel of said friction elements, and an external friction element, substantially as and for the purposes specified.

13. In a draft and buffing mechanism, the combination with friction elements which are relatively movable lineally with a displacement equal to the displacement of the load-applying member and which engage each other, said friction elements having inclined faces, of an interposed spring, and means whereby pressure is induced between said friction elements by both spring-abutment reactions, substantially as and for the purposes specified.

14. In a draft and buffing mechanism, the combination with a spring, of an external coacting friction element, a plurality of friction elements having inclined faces, said friction elements arranged in relatively movable sets comprised of relatively fixed elements, the elements of one set engaging the elements of another set, substantially as and for the purposes specified.

15. In a draft and buffing mechanism, the combination of two friction elements such as 2, two friction elements such as 3, said friction elements 2 and 3 arranged in clusters or sets in which the parts are relatively fixed, the element 2 of one set frictionally engaging element 3 of the other set, and means whereby the relative movement of the friction elements induces friction between said friction elements, substantially as and for the purposes specified.

In testimony whereof I affix my signature, in presence of two witnesses, this 22d day of January, 1904.

FREDERIC WM. RITTER, JR.

Witnesses:
G. P. RITTER,
EDWIN S. CLARKSON.